United States Patent
Chang et al.

(10) Patent No.: US 9,444,079 B2
(45) Date of Patent: Sep. 13, 2016

(54) ELECTRODE STRUCTURE OF LITHIUM BATTERY

(75) Inventors: Tsun-Yu Chang, Taichung (TW); Chun-Chieh Chang, Taichung (TW); Ting-Keng Lin, Taichung (TW)

(73) Assignee: CHANGS ASCENDING ENTERPRISE CO., LTD., Taichung (TW)

( * ) Notice: Subject to any disclaimer, the term of this patent is extended or adjusted under 35 U.S.C. 154(b) by 111 days.

(21) Appl. No.: 13/230,140

(22) Filed: Sep. 12, 2011

(65) Prior Publication Data

US 2012/0148907 A1 Jun. 14, 2012

(30) Foreign Application Priority Data

Dec. 8, 2010 (TW) ................................ 99142819 A

(51) Int. Cl.
*H01M 2/30* (2006.01)
*H01M 2/04* (2006.01)

(52) U.S. Cl.
CPC ............. *H01M 2/0404* (2013.01); *H01M 2/30* (2013.01)

(58) Field of Classification Search
CPC ...................................................... H01M 2/30
See application file for complete search history.

(56) References Cited

U.S. PATENT DOCUMENTS

2009/0029242 A1 * 1/2009 Hirakawa ...................... 429/129

FOREIGN PATENT DOCUMENTS

JP 06089708 A * 3/1994
JP 2010073336 A * 4/2010

* cited by examiner

*Primary Examiner* — Daniel Gatewood
(74) *Attorney, Agent, or Firm* — Muncy, Geissler, Olds & Lowe, P.C.

(57) ABSTRACT

An electrode structure of a lithium battery is provided for electrically connecting a positive pole and a negative pole in a tank of the lithium battery to the external. The electrode structure includes a lid body and at least one electrode body made of sheet metal material. The electrode body has a wrapped portion disposed in the lid body, two ends of the wrapped portion form bent portions respectively, and a connection portion and an output portion extend respectively from the bent portions to protrude from a surface of the lid body. A conductive electrode structure of the lithium battery is formed by wrapping instead of direct penetrating, thus achieving a hermetic effect of conductive positions of the electrode.

4 Claims, 6 Drawing Sheets

ELECTRODE STRUCTURE OF LITHIUM BATTERY

CROSS-REFERENCE TO RELATED APPLICATION

This application claims the benefit of Taiwan Patent Application No. 099142819, filed on Dec. 8, 2010, which is hereby incorporated by reference for all purposes as if fully set forth herein.

BACKGROUND OF THE INVENTION

1. Field of Invention

The present invention relates to an electrode structure of a lithium battery, and more particularly to formation of a conductive electrode structure of the lithium battery by wrapping instead of direct penetrating, thus achieving a hermetic effect of conductive positions of the electrode.

2. Related Art

The lithium battery can be taken as a power supply for high quantity of electricity demands due to significant breakthrough of the material technology (for example, lithium iron phosphate rechargeable battery), for example, to be used in devices with high electricity demands such as electric bicycles and electric wheelchairs, and both storage capacity and power supply of such a non-aqueous electrolytic solution secondary battery with high capacity are greater than those of the traditional lithium battery. The secondary lithium battery and its battery tank are usually aluminum metal tanks. Generally, a metal tank is made by aluminum or stainless steel into a cylindrical shape or a square shape with at least one end having an opening. After a positive pole, a negative pole, and an isolating film of a battery are packaged in the metal tank, to maintain a long-term stable hermeticity in the battery, opening positions of the battery tank may be indeed closed with a lid body through different hermetic technologies, so as to ensure that the battery has good waterproof and gas-tight performances.

An electrode of the existing square lithium battery configures an electrode terminal electrically connected to the external on the lid body, an insulating strip is used therebetween to separate the electrode and the lid body. The lid body, a positive terminal, and the insulating strip are penetrated through rivets, so as to fix the positive terminal on the lid tightly. Further, an insulating strip is disposed below the lid body to isolate the rivet and the lid body, the electrode is welded at a lower end of the rivet, and the positive terminal is connected to a positive pole (or a negative pole) of the battery in the metal tank.

The cylindrical-shaped battery completes an external discharge application through an electrical connection between a conductive handle integrally formed or formed through welding and a conductive terminal penetrating the lid body.

It should be noted that, the current lithium battery, electrode structures connecting an internal battery in a metal tank to the external of a lid body are designed by penetrating the lid body, and a rivet or bolt (conductive terminal) is used as an external electrode. Such a manner of penetrating a lid body and using rigid materials may have the following disadvantages.

1. In terms of the electrode structure in a manner of penetrating a lid body, although a hermetic effect of the position can be achieved through an isolating strip, after being used for a long time, an isolating strip generally using a rubber may generate a gap due to aging; at this time, a through hole is not in a hermetic state, and water vapor may enter the internal of the metal tank of the battery from the position, which reduces the lifespan of the battery.

2. In terms of an external electrode using rigid materials, when more than two lithium batteries are connected in series or in parallel through an electrically connecting element, if the electrically connecting element is also of a rigid material, the through hole of the electrode will be damaged and deformed due to a relative stress of the rigid material when the element is used in high vibration environments such as electric bicycles and electric wheelchairs, so that the through hole is not in a hermetic state, and water vapor may enter the internal of the metal tank of the battery from the position, which reduces the lifespan of the battery.

3. Sectional areas of the part penetrating the lid body (rivet or bolt (conductive terminal)) of the electrode structure and an external contact point are relative smaller; such a structure principle is like that a wide main road has a disproportional bridge at a certain section, and thus it tends to generate a traffic jam at an entrance of the bridge when more cars intend to pass through the bridge. Likewise, when a large amount of electrons intend to pass through the electrode, a thermal energy may occur due to impendence of the part penetrating the lid body; thus, the temperature may be increased during the charge, and the temperature-rise effect may further cause a vicious circle of increase of the impedance, which may endanger safety. Moreover, when a large amount of electric charges are driven by a voltage to pass through the electrode, resistance of the electrode is increased, and the charge and discharge efficiencies are naturally reduced.

4. The existing electrode structure in a penetrating manner and the penetrated lid body thereof need to be installed with elements for hermeticity such as an insulating strip, and the manufacture difficulty and costs thereof are quite high for achieving the hermetic standard.

SUMMARY OF THE INVENTION

Accordingly, to solve the disadvantages, the present invention is directed to an electrode structure of a lithium battery, so that a conductive electrode structure of the lithium battery is formed by indirect penetrating, and water vapor cannot easily enter the internal of the metal tank of the battery, thus achieving a hermetic standard of conductive positions of the electrode.

The present invention is also directed to increase the lifespan of the battery through an elastic-contact electrode structure design, so that the electrode cannot be easily damaged and deformed at an exporting portion of the lid body when being used in high vibration environments.

The present invention is further directed to increase an external contact area of the electrode, so as to be applicable to a large quantity of current, reduce an influence of resistance of the electrode, increase application security of the current, and increase the charge and discharge efficiencies of the lithium battery.

The present invention is also directed to simplify a hermetic structure of the electrode and the lid body, so that the manufacture difficulty and costs of a hermetic standard are lower than those of the prior art with such a simple structure.

To achieve the above objectives, the present invention provides an electrode structure of a lithium battery for electrically connecting a positive pole and a negative pole in a tank of the lithium battery to the external, comprising: a lid body, in which the lid body is integrally formed by means of injection molding using an insulating waterproof material; and at least one electrode body made of sheet metal material, in which a middle section of the electrode body is a wrapped portion disposed in the lid body, one end of the wrapped portion forms a first bent portion, and a connection portion extends from the first bent portion to protrude from a lower surface of the lid body and is electrically connected to the positive pole (or negative pole) in the tank of the battery; and an other end of the wrapped portion forms a second bent portion, and an output portion extends from the second bent portion to protrude from an upper surface of the lid body for conducting electricity to the external.

The output portion forms a third bent portion, and a contact portion extends from the third bent portion.

The upper surface of the lid body is disposed with at least one fixing element, and the fixing element and the wrapped portion of the electrode body may be configured as being in a non-contact state or in a contact state.

The advantage of the present invention lies in that, the wrapped portion of the electrode body and the first and second bent portions are formed in the lid body. In addition to the hermetic effect formed by the wrapping, the bent portions also make the electrode body form an indirect penetrating upper and lower exposing type on the lid body, for prolonging in case of water vapor penetrated from a seam through the bent portions, so as to prevent the water vapor from entering the internal of the tank of the lithium battery due to capillary phenomena. Further, since the electrode body is sheet-shaped, the contact portion extending from the third bent portion can reduce resistance of the electrode and improve the charge and discharge efficiency when a large quantity of electric charges are driven by a voltage to pass through the electrode, in addition to being capable of forming a large contact area externally; also, a shockproof effect is formed due to the third bent portion, which reduces the conventional damage and formation generated by the electrode on the lid body due to a relative stress of rigid materials and increases the lifespan of the lithium battery. Being different from the conventional electrode structure in a manner of penetrating a lid body, a hermetic structure of the electrode and the lid body is simplified; thus a hermetic standard can be achieved without excess hermetic elements, and the manufacture difficulty and costs are lower than those of the prior art.

BRIEF DESCRIPTION OF TILE DRAWINGS

The present invention will become more fully understood from the detailed description given herein below for illustration only, and thus are not limitative of the present invention, and wherein.

DETAILED DESCRIPTION OF THE INVENTION

The details and technology of the present invention is further described now with reference to embodiments; however, it should be understood that, the embodiments are for illustration only, and thus are not limitative of the present invention.

Figure 1:
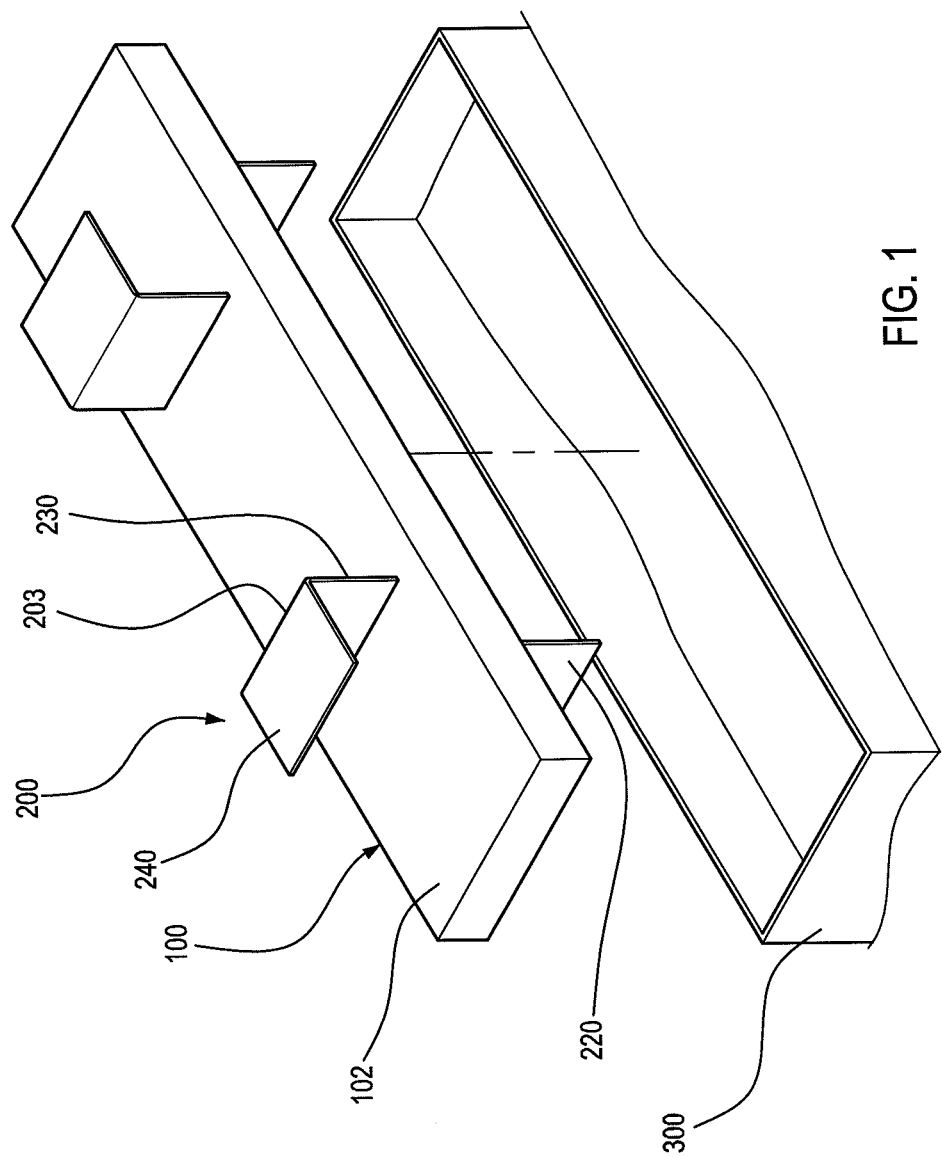
FIG. 1 is a schematic three-dimensional view of a first embodiment according to the present invention.
Figure 2:
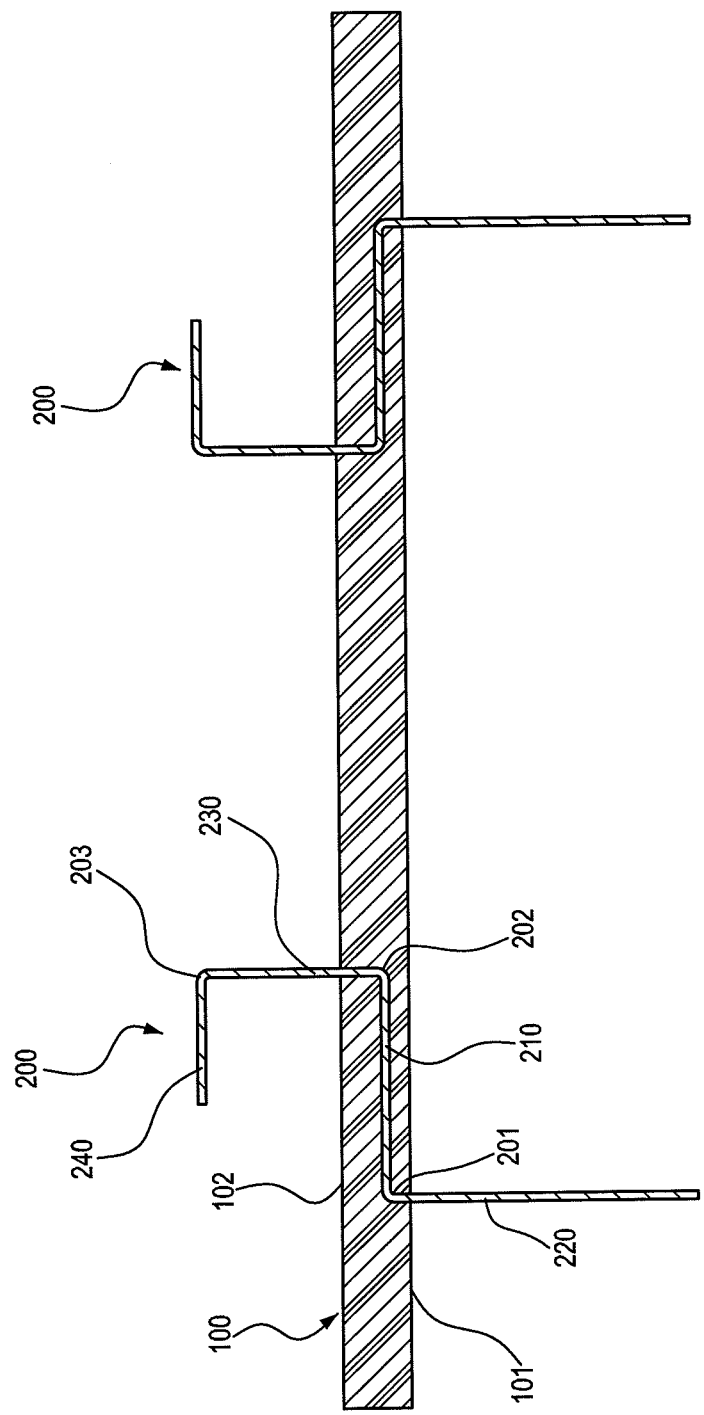
FIG. 2 is a schematic sectional view of the first embodiment according to the present invention.

FIG. 1 and FIG. 2 are a schematic three-dimensional view and a schematic sectional view of a first embodiment according to the present invention. By taking a square type lithium battery as an example for illustration, it is necessary to electrically connecting a positive pole and a negative pole in a tank 300 of the lithium battery to the external. Generally, a square type lithium battery may have two electrode bodies 200 made of sheet metal materials on a lid body 100, for electrically connecting the positive pole and the negative pole (not shown) of the battery in the tank 300 respectively. A middle section of each of the electrode bodies 200 is a wrapped portion 210 disposed in the lid body 100, one end of the wrapped portion 210 forms a first bent portion 201, and a connection portion 220 extends from the first bent portion 201 to protrude from a lower surface 101 of the lid body 100, so that the connection portion 220 is electrically connected to the positive pole (or negative pole) of the battery in the tank 300; and an other end of the wrapped portion 210 forms a second bent portion 202, and an output portion 230 extends from the second bent portion 202 to protrude from an upper surface 102 of the lid body 100, so as to conduct electricity to the external through the output portion 230. Further, one end of the output portion 230 forms a third bent portion 203, and a contact portion 240 extends from the third bent portion 203 for contact applications in the external electrical connection.

In practice, the lid body 100 is integrally formed by means of injection molding using an insulating waterproof material, which can adopt any known material or method, for example, being formed by means of injection molding using plastic material.

In practice, to prevent light from irradiating the internal of the tank 300 through the lid body 100 to damage chemical materials in the tank 300, any known method can be adopted, for example, a sheet metal is disposed in the lid body 100 to increase physical strength and lightproof performance, or a lightproof material is attached to or coated on the lid body 100.

Any known conductive metal material can be adopted for the electrode body 200, for example, common metal materials such as copper and aluminum; the wrapped portion 210 of the electrode body 200 and the first and second bent portions 201 and 202 are formed in the lid body 100, in addition to the hermetic effect formed by the wrapping in practice, the first and second bent portions 201 and 202 also make the electrode body 200 form an indirect penetrating upper and lower exposing type on the lid body 100, and the first and second bent portions 201 and 202 can also prolong in case of water vapor penetrated from an exposing seam, so as to prevent the water vapor from entering the internal of the tank 300 of the lithium battery due to capillary phenomena.

Further, the contact portion 240 extending from the third bent portion 203 can reduce resistance of an external contact surface of the electrode body 200 and improve the charge and discharge efficiency when a large quantity of electric charges are driven by a voltage to pass through the electrode body 200, in addition to being capable of forming a large contact area externally. Since the electrode body 200 is made of sheet metal materials, with the intrinsic elastic effect of the sheet metal, the third bent portion 203 is taken as a support point to make the contact portion 240 have upper and lower cushioning effect when connecting to the external, and the contact portion 240 forms external contact points have the shockproof effect, so as to reduce damage and deformation generated by the electrode due to a relative stress of the conventional rigid materials and increase the lifespan of the lithium battery.

Figure 3:
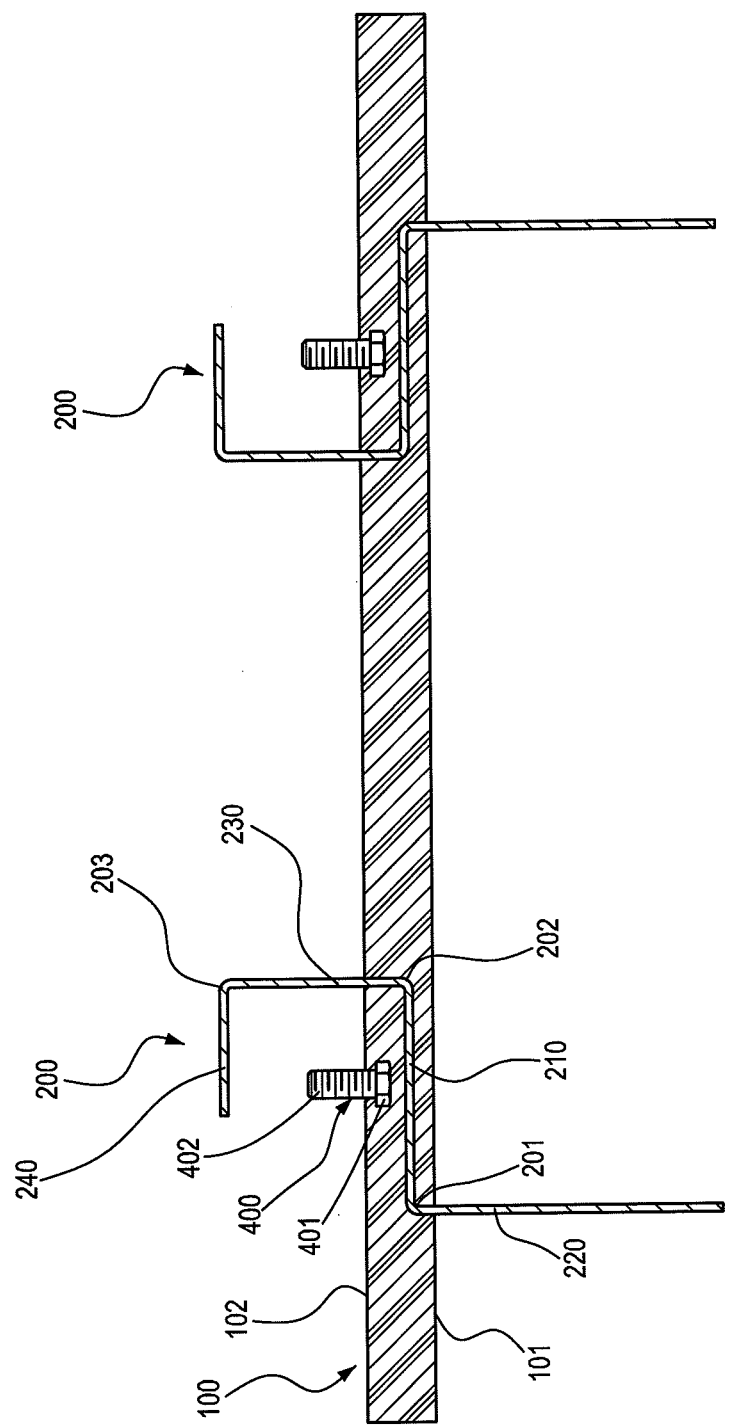
FIG. 3 is a schematic view of another application of the first embodiment according to the present invention.

Referring to FIG. 3, due to fixation demands in practice, for example, when more than two lithium batteries are connected in series or in parallel through an electrically connecting element, the upper surface 102 of the lid body 100 may be disposed with a fixing element 400; in practice, a seaming portion 401 of the fixing element 400 can be wrapped in the lid body 100 when the lid body 100 is integrally formed, and a fixing portion 402 of the fixing element 400 is exposed from the upper surface 102 of the lid body 100, so that the lithium batteries are secured through the fixing portion 402 when being connected in series or in parallel. In practice, the fixing portion 402 can be formed below the contact portion 240, and due to the thickness of the lid body 100, the seaming portion 401 of the fixing element 400 and the wrapped portion 210 can be manufactured as in a non-contact state or in a contact state in the lid body 100.

In this way, the fixing element 400 is no long directly connected to the electrode as in the prior art, and may not damage the connection relation between the electrode body 200 and the lid body 100 due to connection and fixation when being used in high vibration environments such as electric bicycles and electric wheelchairs.

Figure 4:
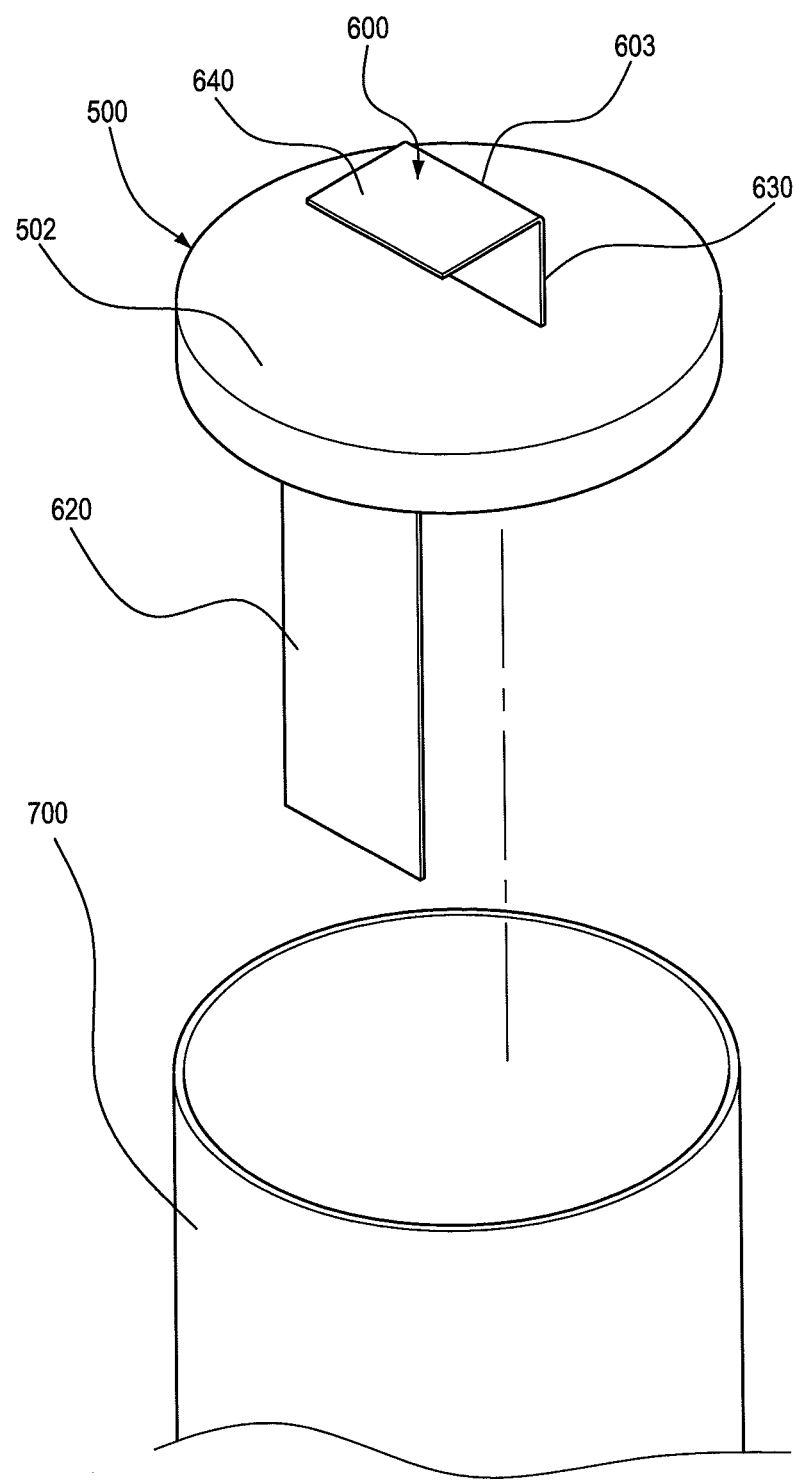
FIG. 4 is a schematic three-dimensional view of a second embodiment according to the present invention.
Figure 5:
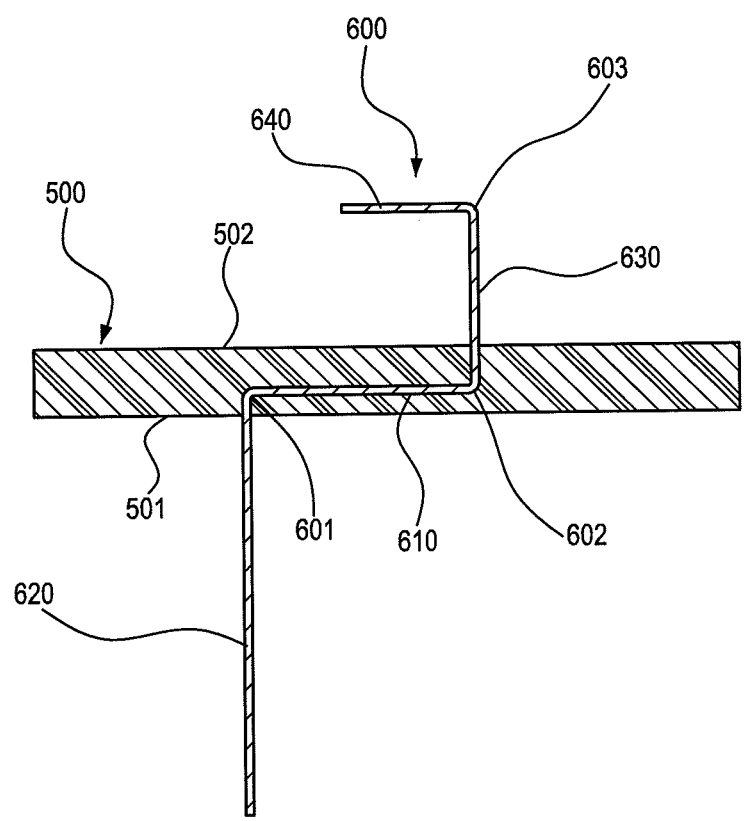
FIG. 5 is a schematic sectional view of the second embodiment according to the present invention.

FIG. 4 and FIG. 5 are a schematic three-dimensional view and a schematic sectional view of a second embodiment according to the present invention. By taking that the present invention is applied to a cylindrical lithium battery as an example for illustration, an electrode of a cylindrical lithium battery generally conducts electricity from two ends respectively; thus, a lid body 500 may have an electrode body 600 of sheet metal material for electrically connecting a positive pole or a negative pole (not shown) of the battery in a tank 700; a middle section of the electrode body 600 is a wrapped portion 610 disposed in the lid body 500, two ends of the wrapped portion 610 form a first bent portion 601 and a second bent portion 602 respectively, a connection portion 620 extends from the first bent portion 601 to protrude from a lower surface 501 of the lid body 500 for electrically connecting the positive pole (or negative pole) of the battery in the tank 700; an output portion 630 extends from the second bent portion 602 to protrude from an upper surface 502 of the lid body 500 for conducting electricity externally; and a third bent portion 603 is formed at one end of the output portion 630, and a contact portion 640 extends from the third bent portion 603 for contact applications in the external electrical connection.

In common with the first embodiment, the lid body 500 is integrally formed by means of injection molding using an insulating waterproof material, which can adopt any known material or method. To prevent light penetration, any known method can be adopted, for example, a sheet metal is disposed in the lid body 500 to increase physical strength and lightproof performance, or a lightproof material is attached to or coated on the lid body 500.

In common with the illustration in the first embodiment, any known conductive metal material can be adopted for the electrode body 600, for example, common metal materials such as copper and aluminum.

Figure 6:
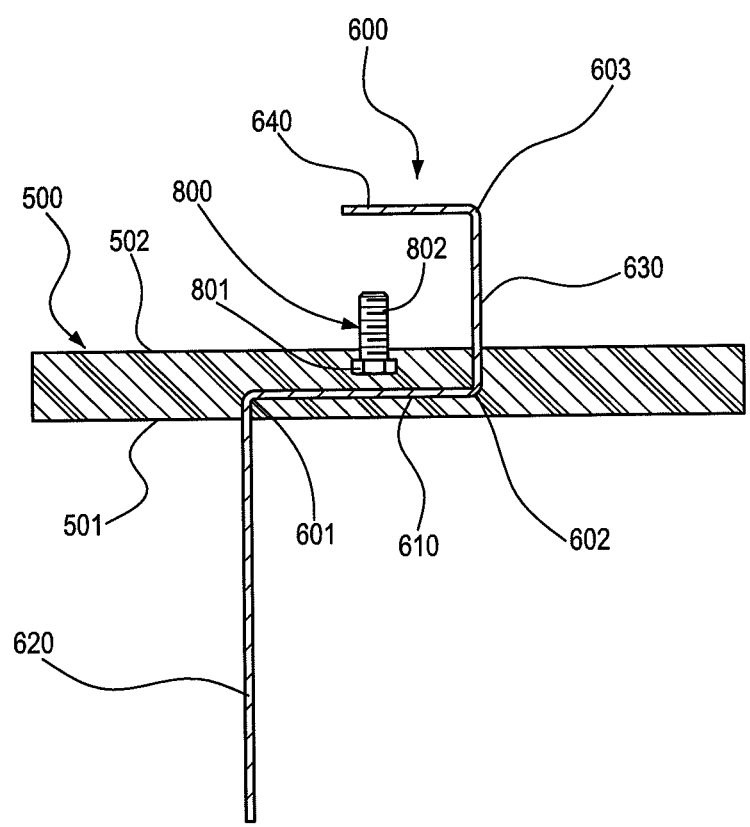
FIG. 6 is a schematic view of another application of the second embodiment according to the present invention.

Referring to FIG. 6, due to fixation demands in practice, for example, when more than two lithium batteries are connected in series or in parallel through an electrically connecting element, the upper surface 502 of the lid body 500 may be disposed with a fixing element 800; in practice, a seaming portion 801 of the fixing element 800 can be wrapped in the lid body 500, and a fixing portion 802 of the fixing element 800 is exposed from the upper surface 502 of the lid body 500, so that, in practice, the seaming portion 801 and the wrapped portion 610 can be manufactured as in a non-contact state or in a contact state in the lid body 500. For a common cylindrical lithium battery, the fixing element 800 is disposed at the center of the upper surface 502 of the lid body 500, which is formed below the contact portion 640, so as to facilitate connection of the cylindrical lithium battery in series or in parallel.

The above are merely preferred embodiments of the present invention, and thus are not intended to limit the scope of the present invention. Any simple equivalent variations and modifications made according to the claims and the background of the invention shall be included within the scope of the following claims.

What is claimed is:
1. An electrode structure of a lithium battery for electrically connecting a positive pole and a negative pole in a tank of the lithium battery to external, comprising:
   a lid structure; and
   at least one electrode body, wherein a middle section of the electrode body is a wrapped portion having a predetermined length and embedded directly within the lid structure in a transverse direction of the lid structure, one end of the wrapped portion forms a first bent portion, and a connection portion extends from the first bent portion to protrude only from a lower surface of the lid structure, the other end of the wrapped portion forms a second bent portion, and an output portion extends from the second bent portion to protrude only from an upper surface of the lid structure,
   wherein the first bent portion and the second bent portion make the electrode body form an indirect penetrating upper and lower exposing type on the lid structure,
   wherein the connection portion and the output portion respectively penetrates through the lower surface and the upper surface of the lid structure, and a distance between the connection portion and the output portion is the same as the length of the wrapped portion, and
   wherein the connection portion, the first bent portion, the wrapped portion, the second bent portion and the output portion are integrally formed by a single metal sheet.

2. The electrode structure according to claim 1, wherein the output portion forms a third bent portion, and a contact portion extends from the third bent portion.

3. The electrode structure according to claim 1, wherein the lid structure is integrally formed by means of injection molding using an insulating waterproof material.

4. The electrode structure according to claim 1, wherein the upper surface of the lid structure is disposed with at least one fixing element.

* * * * *